ENERGY SENSOR

Original Filed July 6, 1964

INVENTORS
MORRY L. SCHIMMEL
ROY H. BLEIKAMP, JR.
VICTOR W. DREXELIUS
BY Gravely, Lieder + Woodruff
ATTORNEYS United States Patent Office Re. 27,073
Reissued Feb. 23, 1971

27,073
ENERGY SENSOR

Morry L. Schimmel, University City, Mo., and Roy H. Bleikamp, Jr., and Victor W. Drexelius, Edwardsville, Ill., assignors to McDonnell Douglas Corporation, St. Louis, Mo., a corporation of Maryland Original No. 3,263,489, dated Aug. 2, 1966, Ser. No. 380,553, July 6, 1964. Application for reissue June 5, 1968, Ser. No. 741,816
Int. Cl. G01n *33/22*
U.S. Cl. 73—35 8 Claims

Matter enclosed in heavy brackets [ ] appears in the original patent but forms no part of this reissue specification; matter printed in italics indicates the additions made by reissue.

*ABSTRACT OF THE DISCLOSURE*

*An energy sensor includes two members which are shiftable relative to each other. One of the members is provided with a socket while the other member fits into the socket. A honeycomb section is positioned in the socket between the two members and has its columns extending parallel to the direction of movement between the members. The honeycomb section is precrushed to overcome its columnar strength. The socket is vented to eliminate back pressure when the members move relative to each other so that the honeycomb section offers substantially the only resistance to forces applied to the members.*

This invention relates to an energy sensor and more particularly to an [explosive] energy sensor which measures [explosive] energy by deformation of a honeycomb sensing element.

Various energy sensors have been used in the past; some utilize plastic deformation of small lead or copper elements, in some instances, referred to as crusher gages, and others utilize plastic deformation of air backed plates or diaphragms referred to as diaphragm gages.

Briefly, the present invention includes a honeycomb section confined within a cylinder by an end cap and piston. The cylinder is conveniently mounted in the path of the explosive charge such that the force of the explosion acts on the piston moving such longitudinally in the cylinder to deform the honeycomb structure against the end cap.

It is therefore an important object of the present invention to provide an energy sensor having a deformable honeycomb structure confined in an enclosure which subjects the honeycomb structure to deformation energy.

It is another object of the invention to provide an explosive energy sensor having a deformable honeycomb sensing element which is relatively inexpensive and affords reproducible results.

It is another object of the invention to provide a honeycomb sensing element for an explosive energy sensor which affords a deformation measurement that varies linearly with the energy to approximately 75 percent of honeycomb length.

It is another object of the invention to provide an energy sensor which includes a replaceable honeycomb sensing element of relatively inexpensive material to provide a wide range energy sensor, depending on the strength of honeycomb selected.

It is another object of the invention to provide an explosive energy sensor having a cylindrical housing, a fixed end cap mounted to said housing, a piston adapted to move within the housing confining a honeycomb sensing element against the end cap, the end cap and housing having apertures to avoid back pressure in the sensor, the piston adapted to move within said housing and deform the honeycomb sensing element when subjected to explosive energy.

Another object of the invention is to provide an explosive energy sensor having an energy sensor element, a cylindrical housing, a fixed end cap mounted to said housing, a piston confining said element within said housing extended and adapted to have a mounting channel for positioning a linear explosive charge for testing purposes.

Another object of the invention is to provide an explosive energy sensor having an energy sensor element, a cylindrical housing, a fixed end cap mounted to said housing, a piston confining said element in said housing adapted to coact with an actuator assembly designed to confine a detonator for measuring the explosive energy of such detonator.

These and other objects and advantages of the invention will become apparent from the description hereinafter and the appended claims, in conjunction with the drawings, wherein:

Figure 1:
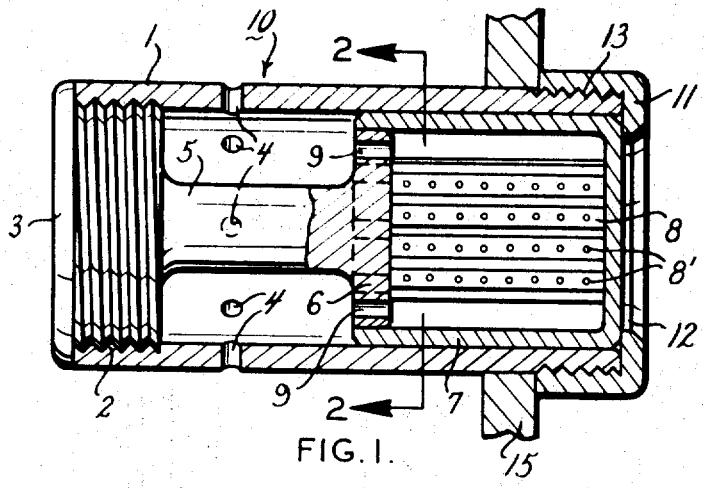
FIG. 1 is a cross-sectional view of the energy sensor.
Figure 2:
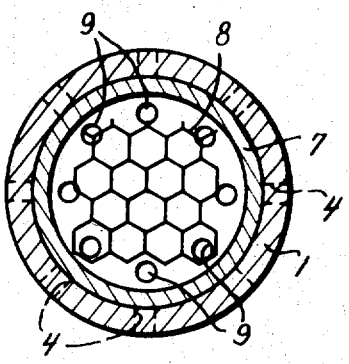
FIG. 2 is a cross-sectional view taken along line 2—2 in FIG. 1.

Referring specifically to FIGS. 1 and 2 there is illustrated the preferred embodiment of the energy sensor, generally designated 10. The explosive energy sensor consists of a cylindrical housing 1 having internal threads 2 adapted to receive end cap 3. The cylinder 1 has apertures 4 to permit pressure equalization on both sides of the cylinder 1. End cap 3 has a reduced dimension shaft 5 which extends into a face plate 6. A hollow piston 7 fits within cylinder 1 and fits over face plate 6 of end cap 3. Confined between piston 7 and face plate 6 is the sensor element, honeycomb section 8 of square cross section. Face plate 6 has apertures 9 therein to prevent pressure buildup between piston 7 and face plate 6. Piston 7 is confined within cylinder 1 by cover 11 which has a central aperture 12. Cylinder 1 is placed against fixed structure 15 along the edge periphery of cover 11. Cover 11 threadedly engages cylinder 1 at external threads 13.

Figure 3:
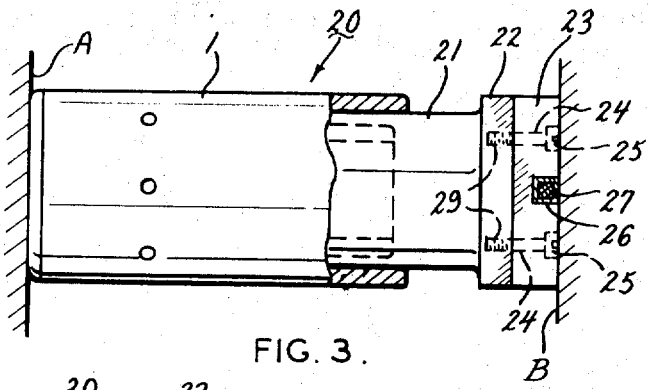
FIG. 3 is a partly broken away view of the energy sensor including a modified piston for testing linear charges.

Referring now to FIG. 3 there is illustrated explosive energy sensor generally designated 20 appertaining to the invention which is similar in all respects to energy sensor 10 described with reference to FIGS. 1 and 2 with the exception that piston 7 of FIG. 1 is modified as piston 21 in the embodiment of FIG. 3. The piston 21 extends beyond housing 1 and has a face plate 22 including threaded bores 29. A holder 23 having apertures 24 aligned with threaded bores 29 abuts face plate 22. Bolts 25 retain holder 23 securely to face 22 of piston 21. The holder includes grooves 26 which retain the linear explosive charge 27 which may be for example mild detonating cord or flexible linear shaped charge, etc. The sensor 20 is positioned against a non-yielding structure so that the maximum derivable amount of explosive energy is absorbed by the sensor element 8.

Figure 4:
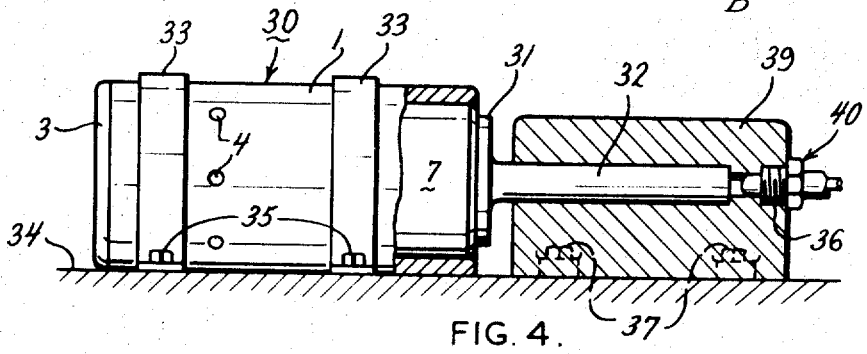
FIG. 4 is a partial cross-sectional view of the energy sensor including a piston adapted to detect energy of a detonator retained within a test housing.

Referring now to FIG. 4 there is illustrated energy sensor 30, similar in principle construction to the energy sensors 10 and 20 of FIGS. 1 and 3. Sensor 30 has a casing 1 which is threaded to receive end cap 3, but not cover 11. A contact plate 21 abuts piston 7 and is an integral portion of projecting ram 32 which fits within an actuator body 39. The sensor 30 is mounted by straps 33 affixed to a mounting surface 34 by bolts 35. The actuator body 39 has a through port 36 which threadedly receives the detonator 40, or other explosive energy sources, such as, but not limited to squibs, pressure cartridges and igniters, to be tested. The actuator body 39 is held to mounting surface 34 by bolts 37.

Typically the explosive or blast energy sensor appertaining to the invention, and as particularly described with reference to FIG. 1, has a honeycomb sensor element which may be of 5052 aluminum ¼ inch hexagonal cells having permeations 8' to permit air passage therethrough and having a wall thickness of 0.0007 of an inch, with a density of 1.6 pounds per cubic foot. The honeycomb is cut one inch square and 1½ inches long. The piston 7 may be aluminum having an internal diameter of about 1.46 inches and an external diameter of about 1.65 inches. Housing 1 is an aluminum cylinder about four inches long and 1.659 internal diameter. End cap 3 is aluminum and fits approximately 2.4 inches into cylinder 1, and face 9 fits within the hollow piston 7, thus having a diameter approximately the internal diameter of piston 7. Prior to cutting honeycomb section 8 to the appropriate length it is pre-crushed about .06 inch. The pre-crushing of the honeycomb section 8 is necessary in order to overcome the initial high columnar strength of the section and put the section in a condition so that its reaction to an applied crushing load or force will result in a substantially uniform absorption of the energy of such load or force.

Figure 5:
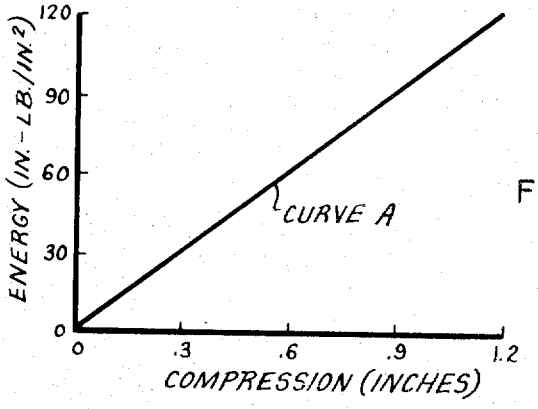
FIG. 5 is a graph depicting the typical straight line function of the honeycomb sensing element of the energy sensor.

For the particular honeycomb sensor element in the sensor constructed as mentioned above, FIG. 5 is a graph for Curve A illustrating compression of the honeycomb sensing element in inches as the abscissa and energy in inch-pounds per square inch as the ordinate. Similar curves for other such energy sensors may be obtained by calibrating the particular strength honeycomb sensor element used in the particular energy sensor. Typically, this may be done by dropping a one-pound weight from various heights to impact against piston 7 (as depicted in FIG. 1). The honeycomb compression is measured at each height. From this, the calibration curve of energy vs. compression may be obtained similar to that illustrated in FIG. 5.

In operation, the explosive energy sensor is exposed to explosive energy along the piston face and this energy is dissipated by deforming the honeycomb sensing element. No pressure build-up occurs in the honeycomb sensor enclosing area because of vent holes 9 and 4 and because the honeycomb itself is permeated to permit air passage. After the sensor element has been exposed to an explosive energy source, the compression is determined by measurement of length of honeycomb crushed. The measured compression is directly proportional to the energy in inch-pounds per square inch for a range of compression up to about 75 percent of honeycomb length.

It will be appreciated that the explosive energy sensor appertaining to the invention has been disclosed with several embodiments, and it is apparent that other modifications and changes will become readily apparent to those skilled in the art. Therefore, such minor modifications and changes as will be suggested are deemed to be within the scope of the invention which is limited solely as necessitated by the scope of the appended claims.

What is claimed is:

1. An explosive blast energy sensor comprising a housing, a fixed plunger in said housing, a piston telescopically received in said housing over and movable relative to the plunger, and a honeycomb section retained in said housing by and between the plunger and piston with its honeycombs directed axially of said plunger and piston so as to be adapted to be uniformly compressed therebetween by explosive energy to be measured impinging on the piston said honeycomb section being pre-crushed by an amount to initially overcome its honeycomb columnar strength, and said housing being vented to atmosphere to free said piston from compressing air.

2. An energy sensor assembly for testing linear explosives comprising a casing, an end member affixed to the casing defining a plunger projecting within the casing having a face plate less than the internal casing dimension, a piston having a hollow head and having an integral connecting rod defining a contact end, said piston retained within the casing with the hollow head fitted about the face plate periphery and the connecting rod projecting from the casing, a honeycomb sensor element confined within the hollow head of the piston by the plunger, and means to mount a linear explosive to the contact face such that on initiation of the explosive the piston will uniformly compress the honeycomb sensor element against the plunger.

3. The sensor assembly of claim 2 wherein the face plate defines through ports and the casing is perforated in the area about the plunger.

4. The sensor assembly of claim 3 wherein means to mount a linear explosive includes a holder mounted to the contact face and defining a support groove for retaining the linear explosive under testing.

5. An explosive energy sensor assembly for testing detonators or other explosive energy sources comprising an energy sensor device including a casing, an end member affixed to the casing defining a plunger projecting within the casing having a face plate less than the internal casing dimension, a piston having a hollow head and having an integral contact face, said piston retained within the casing with the hollow head fitted about the face plate periphery and the contact face exposed external to the casing, and a honeycomb sensor element confined within the hollow head of the piston by the plunger; and an actuator device including a housing defining a through bore and a counterbore, a detonator holder and activating device retained within the counterbore, an actuator rod riding in the through bore and extending from the housing, the actuator rod defining a contact plate external of the housing adjacent in contact face for transmitting blast energy from the detonator under test to the piston effecting compression of the honeycomb sensor element.

6. An energy sensor assembly comprising: a housing open at one end; a face plate mounted in said housing spaced from said open end and having its periphery spaced from the housing interior to provide an annular opening; a hollow piston formed with a closed end face directed outwardly of said housing open end and an elongated skirted portion sliding within said housing and fitting through said annular opening about the periphery of said face plate; means in said face plate and housing venting the hollow of said piston to atmosphere; and a pre-crushed honeycomb element mounted in said hollow piston between said end face and said face plate, said element consisting of a plurality of walls forming axially elongated cells oriented between said end face and face plate, said cell walls having permeations to permit air passage therebetween and into said hollow piston, whereby said element will freely crush further upon application of energy to said end face forcing the latter toward said face plate.

*7. A device for measuring energy, said device comprising a nondeformable first member having a socket and an abutment extending across one end of the socket, a nondeformable second member fitted into the socket of the first member to form an enclosed chamber therewith and having an abutment located opposite to the abutment of the first member, the second member being adapted to shift relative to the first member for changing the volume of the chamber concurrently with altering the distance*

*between the abutments, an opening between the chamber and the exterior to vent the chamber upon change in volume to substantially eliminate back pressure on the abutments with change in distance therebetween, and a honeycomb section located within the chamber with its columns extending parallel to the direction of relative movement of said members and its ends positioned at the abutments, the honeycomb section being precrushed by an amount to initially overcome its columnar strength, whereby opposing forces acting upon the members and oriented substantially in the direction of relative movement of said members will be transmitted to the honeycomb section through the abutments, causing the honeycomb section to crush still further and provide an indication of the amount of energy absorbed.*

*8. A device according to claim 7 wherein the sides of said honeycomb sections are uncovered so that the outermost honeycomb columns are exposed to the chamber.*

References Cited

The following references, cited by the Examiner, are of record in the patented file of this patent or the original patent.

UNITED STATES PATENTS

| | | | |
|---|---|---|---|
| 2,620,652 | 12/1952 | Hartmann | 73—35 |
| 2,870,631 | 1/1959 | Musser et al. | 73—167 |
| 3,082,846 | 3/1963 | Jensen et al. | 73—12X |
| 3,130,819 | 4/1964 | Marshall | 188—1(C) |
| 3,178,935 | 4/1965 | McRitchie | 73—94 |
| 3,252,548 | 5/1966 | Pajak et al. | 188—1(C) |

FOREIGN PATENTS

| | | |
|---|---|---|
| 10,442 | 1898 | Great Britain. |

JAMES J. GILL, Primary Examiner

U.S. Cl. X.R.

188—1